US012762894B2

(12) United States Patent
Liao

(10) Patent No.: US 12,762,894 B2
(45) Date of Patent: Oct. 13, 2026

(54) ELECTRONIC DEVICE AND METHOD FOR MEASURING DEGREE OF EYELID CLOSURE STRENGTH

(71) Applicant: HTC Corporation, Taoyuan City (TW)

(72) Inventor: Yu-Hsien Liao, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 279 days.

(21) Appl. No.: 18/673,243

(22) Filed: May 23, 2024

(65) Prior Publication Data

US 2025/0363828 A1 Nov. 27, 2025

(51) Int. Cl.

*G06V 10/74* (2022.01)
*G06V 10/44* (2022.01)
*G06V 40/18* (2022.01)

(52) U.S. Cl.

CPC ............ *G06V 40/197* (2022.01); *G06V 10/44* (2022.01); *G06V 10/74* (2022.01)

(58) Field of Classification Search

None
See application file for complete search history.

(56) References Cited

FOREIGN PATENT DOCUMENTS

WO WO-2022269654 A1 * 12/2022 ............ B60W 40/08
WO WO-2023181862 A1 * 9/2023 ............ G06V 40/18
WO WO-2024018593 A1 * 1/2024 ........... G06V 10/761

* cited by examiner

*Primary Examiner* — Idowu O Osifade
(74) *Attorney, Agent, or Firm* — JCIPRNET

(57) ABSTRACT

An electronic device and a method for measuring a degree of eyelid closure strength are provided. The method includes: obtaining an image of an eye; detecting at least one wrinkle in the image; determining a degree of eyelid closure strength according to an area of the at least one wrinkle; and outputting the degree of the eyelid closure strength.

16 Claims, 5 Drawing Sheets

ELECTRONIC DEVICE AND METHOD FOR MEASURING DEGREE OF EYELID CLOSURE STRENGTH

BACKGROUND

Technical Field

The disclosure relates to image processing, and particular relates to an electronic device and a method for measuring a degree of eyelid closure strength.

Description of Related Art

In recent years, extended reality (XR) technologies, including eye-tracking, have been widely applied across various fields. For instance, XR devices can track user's eye movements for interaction within XR environments. Additionally, image capture devices can capture user's facial expressions (e.g., open or closed eyes) and synchronously map these expressions onto user's virtual avatar. However, the eye-tracking technologies currently employed in XR devices have several drawbacks. For example, image processing techniques may identify whether a user's eyes are closed based on the shape of their eyebrows. Nevertheless, a below screen type eye-tracking device may face challenges in capturing the image of user's eyebrows if the field of view (FoV) of the eye-tracking device is too small. How to determine the degree of user's eye closure is a significant challenge in the field of eye-tracking technology.

SUMMARY

The present invention is directed to an electronic device and a method for measuring a degree of eyelid closure strength.

The present invention is directed to an electronic device for measuring a degree of eyelid closure strength. The electronic device includes a transceiver and a processor. The processor is coupled to the transceiver, wherein the processor is configured to: obtain an image of an eye via the transceiver; detect at least one wrinkle in the image; determine a degree of eyelid closure strength according to an area of the at least one wrinkle; and output the degree of eyelid closure strength via the transceiver.

The present invention is directed to a method for measuring a degree of eyelid closure strength. The method includes: obtaining an image of an eye; detecting at least one wrinkle in the image; determining a degree of eyelid closure strength according to an area of the at least one wrinkle; and outputting the degree of the eyelid closure strength.

Based on above, the present invention may measure a degree of eyelid closure strength of a user according to an image of the user's eye.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
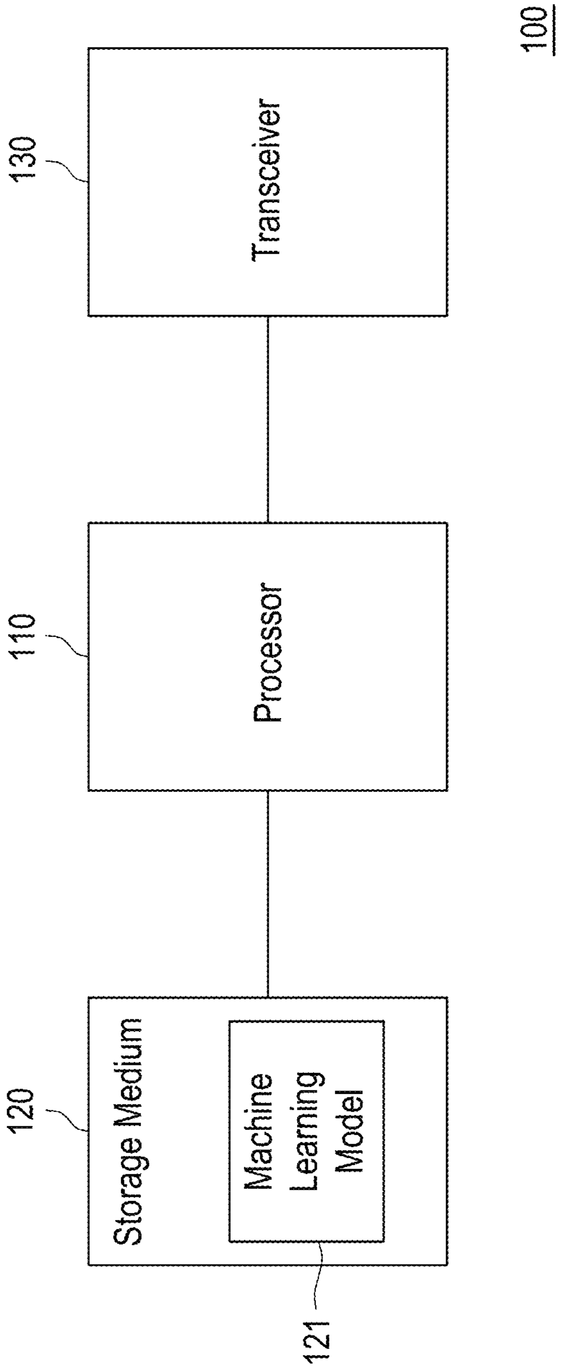
FIG. 1 illustrates a block diagram of an electronic device for measuring a degree of eyelid closure strength according to one embodiment of the present invention.

FIG. 1 illustrates a block diagram of an electronic device 100 for measuring a degree of eyelid closure strength according to one embodiment of the present invention. The electronic device 100 may include a processor 110, a storage medium 120, and a transceiver 130. The electronic device 100 may be implemented in, for example, an XR system (e.g., virtual reality (VR) system, augmented reality (AR) system, or mixed reality (MR) system).

The processor 110 may be, for example, a central processing unit (CPU) or other programmable micro control units (MCU) for general purpose or special purpose, a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), or other similar device or a combination of the above devices. The processor 110 may be coupled to the storage medium 120 and the transceiver 130.

The storage medium 120 may be, for example, any type of fixed or removable random access memory (RAM), a read-only memory (ROM), a flash memory, a hard disk drive (HDD), a solid state drive (SSD) or similar element, or a combination thereof, configured to record a plurality of modules or various applications executable by the processor 110. In one embodiment, the storage medium 120 may store a machine learning model 121.

The transceiver 130 may be configured to transmit or receive wired or wireless signals. The transceiver 130 may also perform operations such as low noise amplifying, impedance matching, frequency mixing, up or down frequency conversion, filtering, amplifying, and so forth.

Figure 2:
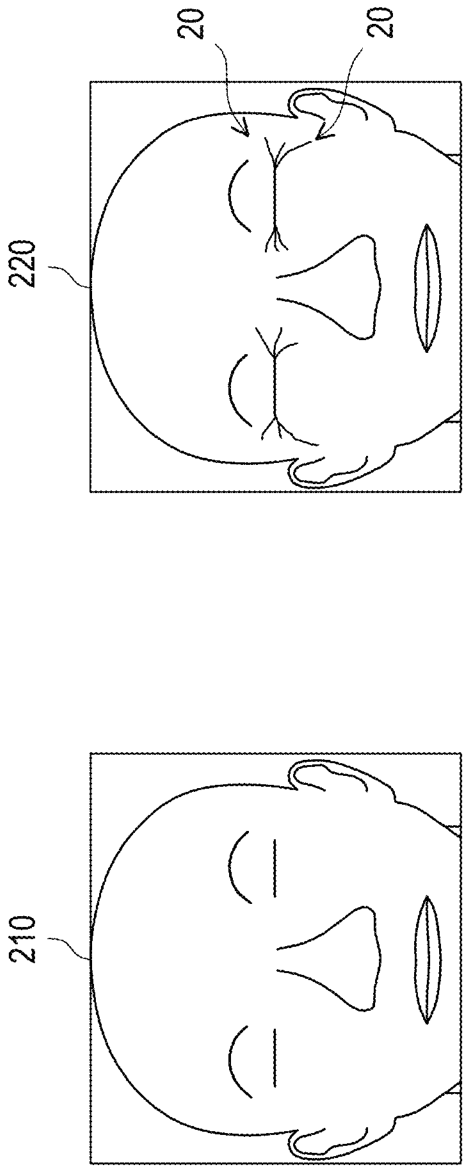
FIG. 2 illustrates a schematic diagram of different types of eyelid closure according to one embodiment of the present invention.

FIG. 2 illustrates a schematic diagram of different types of eyelid closure according to one embodiment of the present invention. Image 210 shows a person closing their eyes normally. That is, the person closes their eyes without exerting force on their eyelids. Accordingly, no wrinkles appear around the person's eyes. On the other hand, image 220 shows a person closing their eyes tightly. That is, the person is exerting significant force on his eyelids when closing their eyes. Accordingly, one or more winkles 20 appears around the person's eyes. Based on the above, the appearance of wrinkles around a person's eyes may be associated with the degree of eyelid closure strength. The present invention provides a method for measuring the degree of eyelid closure strength based on the wrinkles around a person's eyes.

Figure 3:
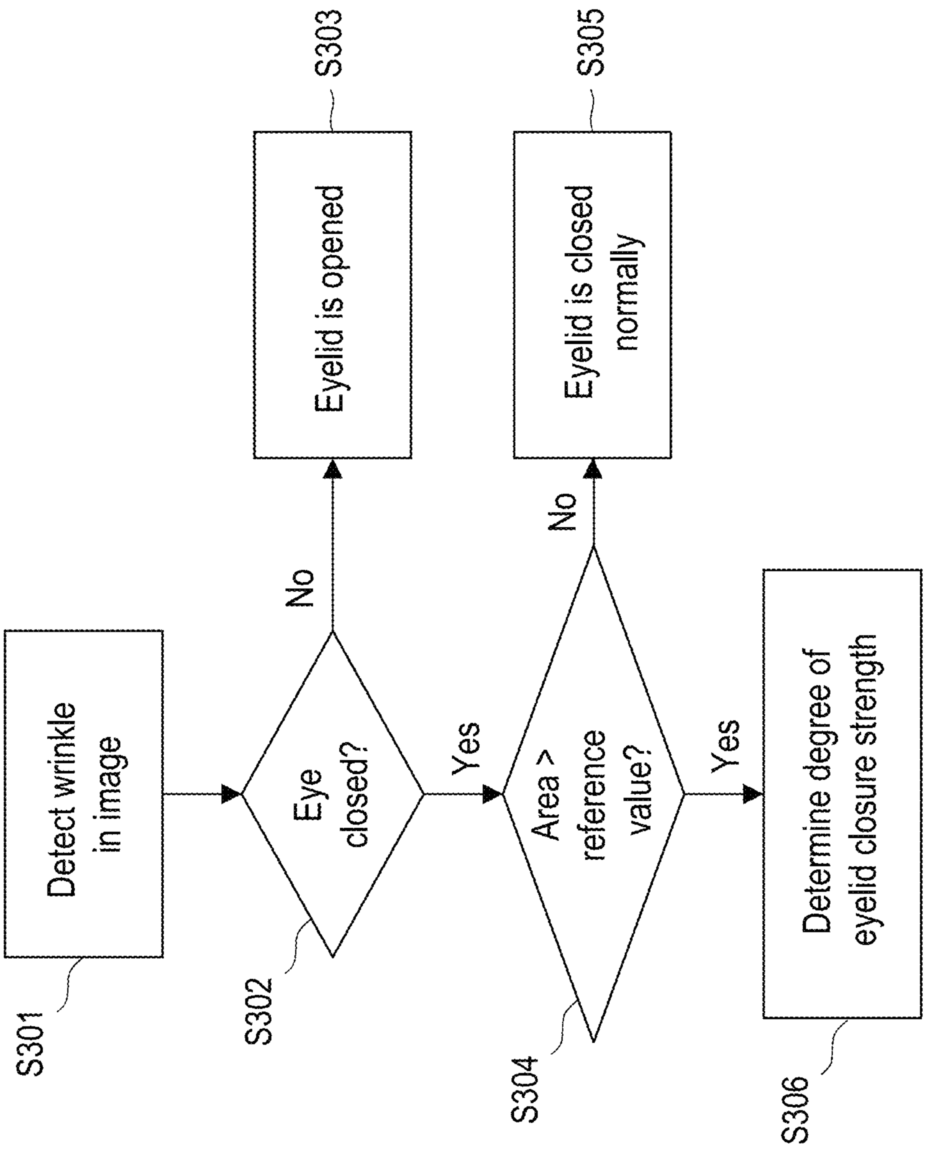
FIG. 3 illustrates a flowchart of determining the degree of eyelid closure strength according to one embodiment of the present invention.

FIG. 3 illustrates a flowchart of determining the degree of eyelid closure strength according to one embodiment of the present invention, wherein the steps of the flowchart may be implemented by the electronic device 100 as shown in FIG. 1.

In step S301, the processor 110 may obtain an image of an eye via the transceiver 130. The processor 110 may detect one or more wrinkles in the image.

In one embodiment, the processor 110 may obtain an original image including a face of a user. Then, the processor 110 may perform an object detection on the original image to recognize the eye of the user and capture the image of the eye from the original image accordingly.

In one embodiment, the processor 110 may perform an edge detection on the image to detect the wrinkles in the image. For example, the processor 110 may perform Canny edge detection on the image to detect the wrinkles in the image. Specifically, the processor 110 may detect the image (e.g., by applying an object detection) to obtain a region of interest (ROI) corresponding to the user's eye. The processor 110 may perform Gaussian blurring on the ROI to obtain a blurred image. After the blurred image is obtained, the processor 110 may calculate a gradient of each pixel of the blurred image according to Sobel operator, as shown in equation (1) to equation (3), wherein A represents the blurred image and G represents a gradient of a pixel in the blurred image. After the gradient of each pixel of the blurred image is obtained, the processor 110 may perform non-maximum suppression on the gradient of each pixel of the blurred image to obtain one or more edges. The processor 110 may set the one or more edges as the one or more wrinkles.

$$G_x = A * \begin{bmatrix} 1 & 0 & -1 \\ 2 & 0 & -2 \\ 1 & 0 & -1 \end{bmatrix} \tag{1}$$

$$G_y = A * \begin{bmatrix} 1 & 2 & 1 \\ 0 & 0 & 0 \\ -1 & -2 & -1 \end{bmatrix} \tag{2}$$

$$G = \sqrt{G_x^2 + G_y^2} \tag{3}$$

Figure 4:
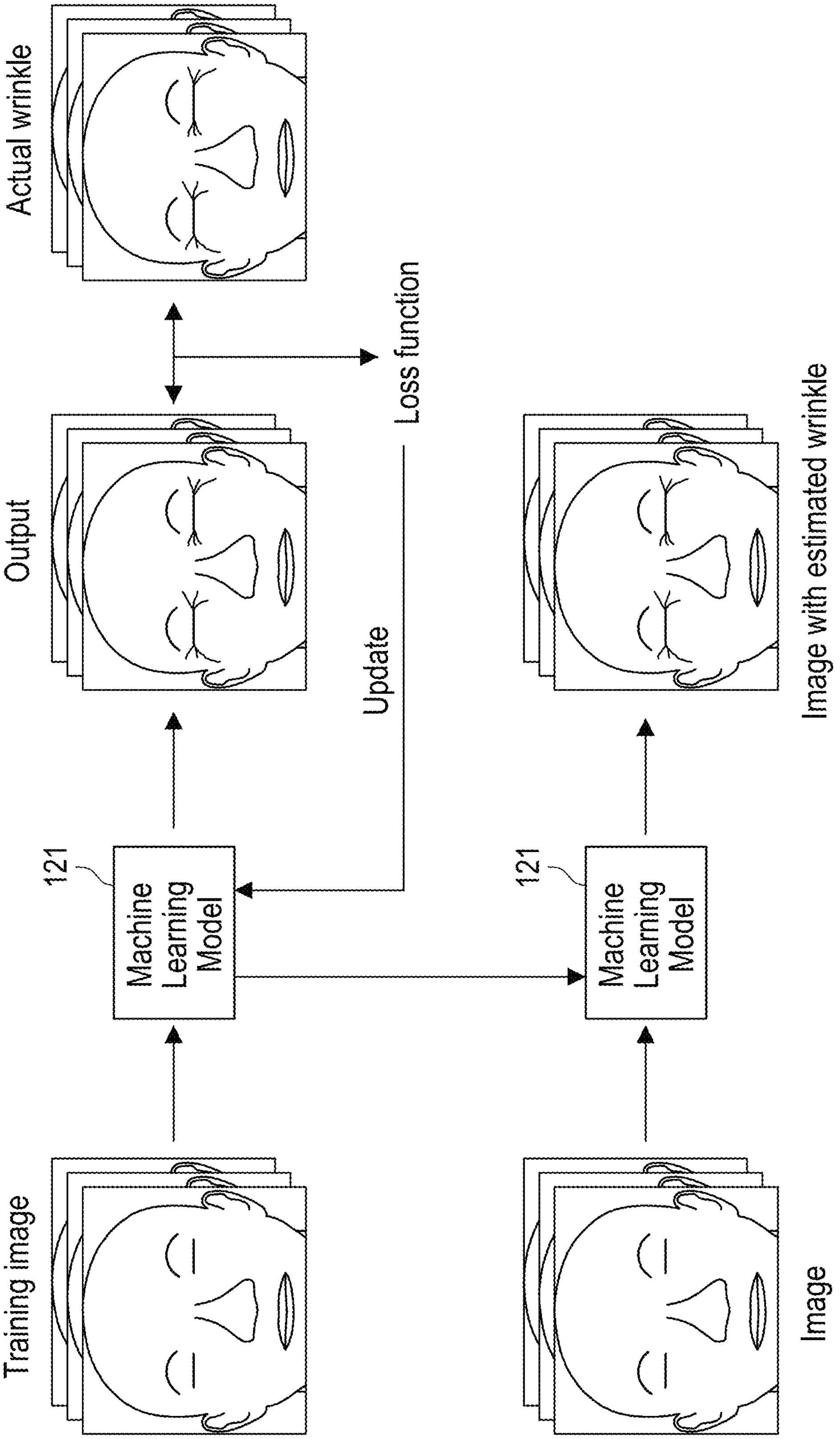
FIG. 4 illustrates a schematic diagram of training and usage of machine learning model according to one embodiment of the present invention.

In one embodiment, the processor 110 may detect the wrinkles in the image by using the machine learning (ML) model 121. FIG. 4 illustrates a schematic diagram of training and usage of machine learning model 121 according to one embodiment of the present invention. The processor 110 may train the ML model 121 according to a set of training images based on a supervised learning algorithm, wherein each training image may be labeled with one or more actual wrinkles. The loss function of the supervised learning algorithm may be a binary cross entropy (BCE), as shown in equation (4), wherein Loss represents the BCE, T(x,y) represents the pixel with coordinate (x,y) in the image labelled with the actual wrinkle, and P(x,y) represents the pixel with coordinate (x,y) in the image labelled with the estimated wrinkle (i.e., the image output by the ML model 121). After the ML model 121 is trained, the processor 110 may input an image of an eye into the ML model 121 to output one or more estimated wrinkles in the image of the eye.

$$\text{Loss} = \sum_{x=1}^{M} \sum_{y=1}^{N} (T(x, y) \cdot \log P(x, y) + (1 - T(x, y) \cdot \log(1 - P(x, y)))) \tag{4}$$

Back to FIG. 3, in step S302, the processor 110 may determine whether the eye in the image is closed. If the eye in the image is closed, proceeding to step S304. If the eye in the image is not closed, proceeding to step S303. In one embodiment, the processor 110 may determine whether the eye in the image is closed by performing image recognition on the image.

In step S303, the processor 110 may determine that the eyelid of the user is opened.

In step S304, the processor 110 may compare the area of the one or more wrinkles with a reference value. The processor 110 may determine whether the area of the one or more wrinkles is greater than the reference value, wherein the reference value may be associated with the area of the wrinkles of a person when the person close their eyes normally. If the area of the one or more wrinkles is greater than the reference value, proceeding to step S306. If the area of the one or more wrinkles is less than or equal to the reference value, proceeding to step S305. In one embodiment, the processor 110 may calculate the area of the one or more wrinkles according to the number of pixels in the one or more wrinkles.

In step S305, the processor 110 may determine that the user closes their eyes normally. That is, the user closes their eyes without exerting force on their eyelids. The processor 110 may determine the degree of eyelid closure strength based on a default value, wherein the default value may indicate that there is no significant force exerted on the eyelid in the image. The processor 110 may output the degree of the eyelid closure strength via the transceiver 130. For example, the processor 110 may output the degree of the eyelid closure strength to a virtual avatar system, and the virtual avatar system may update the expression (e.g., facial features or emotions) of the virtual avatar according to the degree of eyelid closure strength.

In step S306, the processor 110 may determine the degree of eyelid closure strength based on a difference between the area of the one or more wrinkles and the reference value, as shown in equation (5), wherein D represents the degree of eyelid closure strength, A1 represents the area of the one or more wrinkles, and A2 the reference value. The reference value may be associated with the area of wrinkles appearing when a person closes their eyes normally. The processor 110 may output the degree of the eyelid closure strength via the transceiver 130.

$$D = A1 - A2 \tag{5}$$

Figure 5:
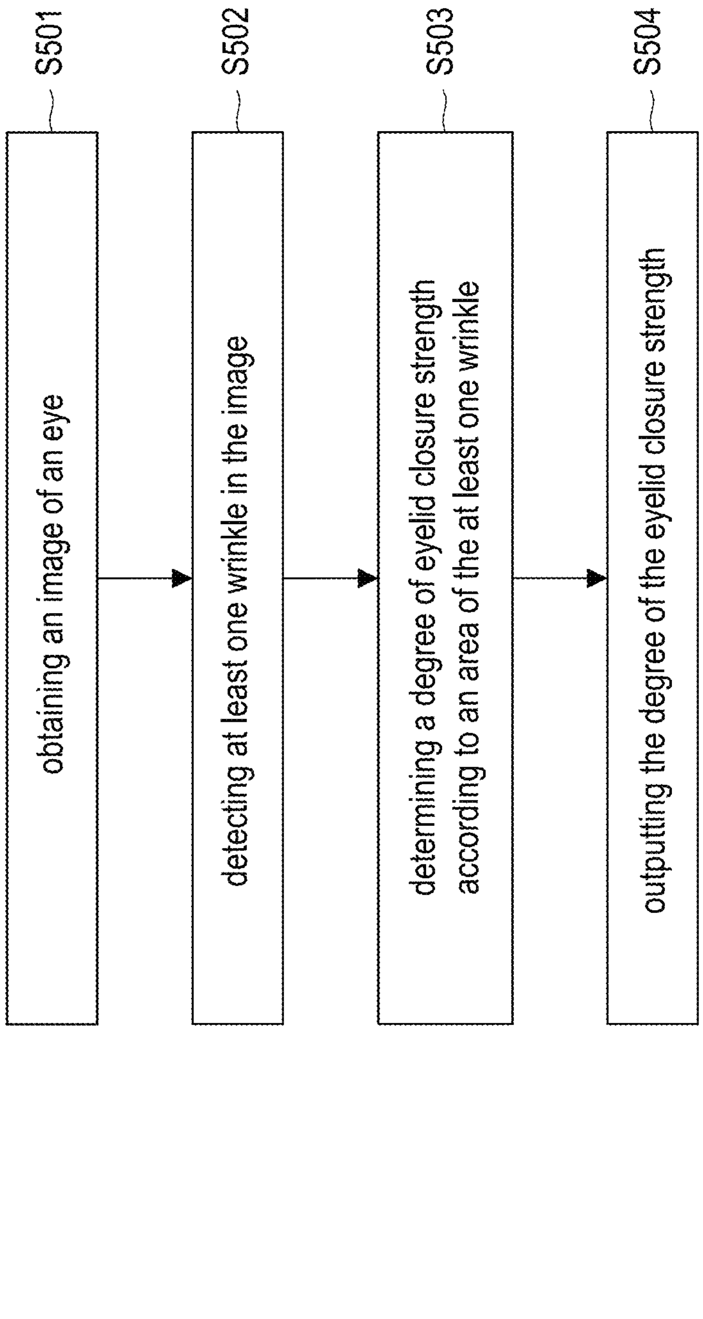
FIG. 5 illustrates a flowchart of a method for measuring a degree of eyelid closure strength according to one embodiment of the present invention.

FIG. 5 illustrates a flowchart of a method for measuring a degree of eyelid closure strength according to one embodiment of the present invention, wherein the method may be implemented by the electronic device 100 as shown in FIG. 1. In step S501, obtaining an image of an eye. In step S502, detecting at least one wrinkle in the image. In step S503, determining a degree of eyelid closure strength according to an area of the at least one wrinkle. In step S504, outputting the degree of the eyelid closure strength.

In summary, the present invention provides a manner for measuring the degree of eyelid closure strength of a user, wherein the degree of eyelid closure strength may represent how hard the user closes his eyes. The electronic device of the present invention may determine the degree of eyelid closure strength based on an image of eye only. Since the image of eye does not have to include other parts (e.g., eyebrow) of user's face, the FoV of the camera capturing the image does not have to be large. For example, the manner of the present invention may be applied on the image captured by a below screen type eye tracker. In addition, the image processing of the present invention may require fewer computing resources. The output of the present invention may be applied on various fields such as XR technology or virtual avatar technology.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device for measuring a degree of eyelid closure strength, comprising:

a transceiver; and a processor, coupled to the transceiver, wherein the processor is configured to:

obtain an image of an eye via the transceiver;

detect at least one wrinkle in the image;

determine a degree of eyelid closure strength according to an area of the at least one wrinkle; and output the degree of eyelid closure strength via the transceiver, wherein the processor is further configured to:

perform an edge detection on the image to detect the at least one wrinkle;

detect the image to obtain a region of interest;

perform Gaussian blurring on the region of interest to obtain a blurred image;

calculate a gradient of each pixel of the blurred image;

perform non-maximum suppression on the gradient of each pixel to obtain at least one edge; and set the at least one edge as the at least one wrinkle.

2. The electronic device according to claim 1, wherein the processor is further configured to:

compare the area of the at least one wrinkle with a reference value to determine the degree of eyelid closure strength.

3. The electronic device according to claim 2, wherein the processor is further configured to:

in response to the area being greater than the reference value, determine the degree of eyelid closure strength according to a difference between the area and the reference value.

4. The electronic device according to claim 2, wherein the processor is further configured to:

in response to the area being less than or equal to the reference value, determine the degree of eyelid closure strength according to a default value.

5. The electronic device according to claim 1, further comprising:

a storage medium, coupled to the processor and stores a machine learning model, wherein the processor is further configured to:

input the image into the machine learning model to output the at least one wrinkle in the image.

6. The electronic device according to claim 5, wherein the processor is further configured to:

train the machine learning model according a training image based on a supervised learning algorithm, wherein the training image is labeled with an actual wrinkle.

7. The electronic device according to claim 6, wherein a loss function of the supervised learning algorithm comprises a binary cross entropy.

8. The electronic device according to claim 1, wherein the processor is further configured to:

calculate the area of the at least one wrinkle according to a number of pixels in the at least one wrinkle.

9. A method for measuring a degree of eyelid closure strength, comprising:

obtaining an image of an eye;

detecting at least one wrinkle in the image;

determining a degree of eyelid closure strength according to an area of the at least one wrinkle; and outputting the degree of the eyelid closure strength, wherein the step of performing the edge detection on the image to detect the at least one wrinkle comprising:

performing an edge detection on the image to detect the at least one wrinkle;

detecting the image to obtain a region of interest;

performing Gaussian blurring on the region of interest to obtain a blurred image;

calculating a gradient of each pixel of the blurred image;

performing non-maximum suppression on the gradient of each pixel to obtain at least one edge; and setting the at least one edge as the at least one wrinkle.

10. The method according to claim 9, wherein the step of determining the degree of eyelid closure strength according to the area of the at least one wrinkle comprising:

comparing the area of the at least one wrinkle with a reference value to determine the degree of eyelid closure strength.

11. The method according to claim 10, wherein the step of determining the degree of eyelid closure strength according to the area of the at least one wrinkle further comprising:

in response to the area being greater than the reference value, determining the degree of eyelid closure strength according to a difference between the area and the reference value.

12. The method according to claim 10, wherein the step of determining the degree of eyelid closure strength according to the area of the at least one wrinkle further comprising:

in response to the area being less than or equal to the reference value, determining the degree of eyelid closure strength according to a default value.

13. The method according to claim 9, wherein the step of detecting the at least one wrinkle in the image comprising:

inputting the image into a machine learning model to output the at least one wrinkle in the image.

14. The method according to claim 13, further comprising:

training the machine learning model according to a training image based on a supervised learning algorithm, wherein the training image is labeled with an actual wrinkle.

15. The method according to claim 14, wherein a loss function of the supervised learning algorithm comprises a binary cross entropy.

16. The method according to claim 9, further comprising:

calculating the area of the at least one wrinkle according to a number of pixels in the at least one wrinkle.

* * * * *